United States Patent [19]
Rimmer et al.

[11] Patent Number: 5,179,666
[45] Date of Patent: Jan. 12, 1993

[54] BLOCK ORIENTED PERIPHERAL DEVICE INTERFACE

[75] Inventors: Todd M. Rimmer, Frazer; William P. Jordan, Ephrata, both of Pa.

[73] Assignee: Unisys Corporation, Plymouth Meeting, Pa.

[21] Appl. No.: 534,428

[22] Filed: Jun. 7, 1990

[51] Int. Cl.$^5$ .............................................. G06F 13/00
[52] U.S. Cl. ................................ 395/275; 364/254.3; 364/DIG. 1; 364/957.1; 364/DIG. 2
[58] Field of Search ... 364/200 MS File, 900 MS File, 364/254.3, DIG. 1, 957.1, DIG. 2; 395/275

[56] References Cited

U.S. PATENT DOCUMENTS

| | | | |
|---|---|---|---|
| 4,649,479 | 3/1987 | Advani et al. | 364/200 |
| 4,742,447 | 5/1988 | Duvall et al. | 364/200 |
| 4,747,040 | 5/1988 | Blanset et al. | 364/200 |
| 4,901,231 | 2/1990 | Bishop et al. | 364/200 |
| 4,951,245 | 8/1990 | Bailey et al. | 364/900 |
| 4,972,368 | 11/1990 | O'Brien et al. | 364/900 |
| 4,975,829 | 12/1990 | Clarey et al. | 364/200 |

FOREIGN PATENT DOCUMENTS 192924 9/1986 European Pat. Off. .

OTHER PUBLICATIONS

Operating Systems-Design & Implementation by Andrew S. Tanenbaum (author) Prentice-Hall International Editions (110–122 13 pages) 1987.
"Unix Internals"; Myril Clement Shaw and Susand Soltis Shaw; Copyright 1987; pp. 131–140, 147–151.
"Device Drivers for Unix, Character mode? Block mode? ioctl()? A starter Kit for Unix I/O"; Tim Parker; pp. 49–51, 54–56.

Primary Examiner—Michael R. Fleming
Assistant Examiner—Glenn A. Auve
Attorney, Agent, or Firm—Ratner & Prestia

[57] ABSTRACT

A common peripheral device interface module is disclosed for use with Unix (Unix is a trademark of AT&T) operating system which is flexible enough to support many types of disk or tape device drivers. A common disk module (CDM) is included. The CDM contains high level disk operation commands which may be used for common reference to each disk driver on the system. Routines within the CDM are accessed by the Unix system call interface through a series of operating system entry points. Additional routines are included with the pre-existing Unix operating system Disk I/O Subsystem to improve interfacing between this subsystem and the CDM. A common tape module (CTM) is used to perform high level tape operation routines. The Unix system call interface communicates with the CTM through a group of operating system entry points. Because of the large number of possible root disk device drives, the root disk device driver can be dynamically selected for the Unix operating system. Each controller which is resident within the system checks in with the operating system. The controller which checks in first with the operating system is used for booting up the system. Each controller which checks in is matched with an appropriate device driver. The matched device drivers are then used for disk I/O functions.

5 Claims, 19 Drawing Sheets

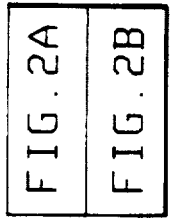
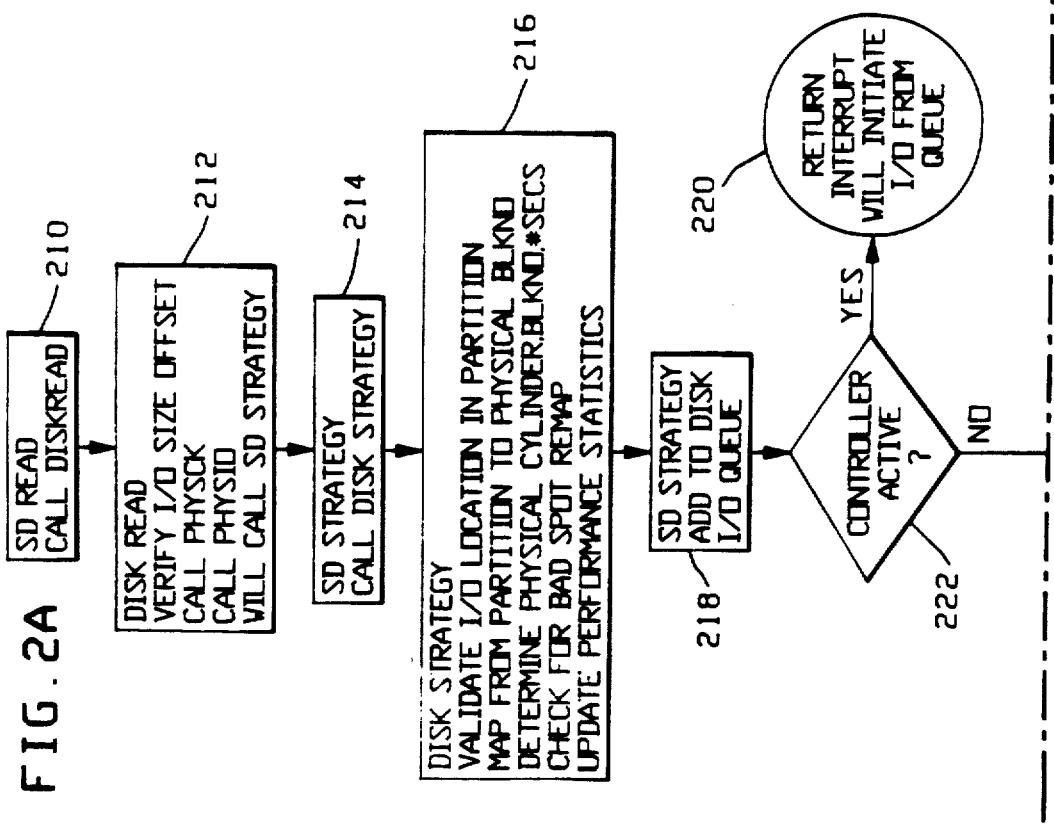

BLOCK ORIENTED PERIPHERAL DEVICE INTERFACE

A microfiche Appendix is included in this application containing 2 microfiche. Microfiche Number 1 contains 97 frames plus one test target frame for a total of 98 frames. Microfiche Number 2 contains 54 frames plus one test target frame for a total of 55 frames.

A portion of this patent document contains material which is subject to copyright protection. The owner has no objection to the facsimile reproduction by anyone of the patent document or patent disclosure as it appears in the Patent and Trademark Office patent file or records, but otherwise reserves all rights whatsoever.

FIELD OF INVENTION

This invention is in the field of computing systems, and specifically is directed to device drivers within computer systems. In particular, an improved device driver scheme is disclosed for operation in a Unix TM environment.

BACKGROUND OF THE INVENTION

In a conventional computer system, software routines exist for interfacing between the operating system and specific peripheral devices. Such software routines are called device drivers. Typically, device drivers operate by instructing peripheral devices to perform input and output (I/O) functions. Device drivers perform input and output operations based on commands which are received from the operating system. In a Unix environment, each peripheral device in the computer system is associated with a device driver.

In Unix system development, it is often necessary to create various device drivers for the numerous peripheral devices which may be connected to a computer system. These peripheral devices include disk drive units and tape drive units. Furthermore, such peripheral devices are integrated with a current Unix operating System. Typically, the creation of such device drivers is performed by duplicating an existing device driver and modifying it in accordance with the particularities of a new peripheral device or peripheral device controller. One drawback of this approach is that duplicate code is placed in each device driver to support operating system and application interfaces. Thus, if new features are later incorporated into the computer system, each device driver must be individually modified to ensure proper interfacing between current device drivers and an altered operating system environment. Another drawback of this approach is the excessive memory use caused by code duplication.

Another problem which exists in tape drive device drivers is the lack of buffering between these device drivers and the Unix operating system (i.e. the kernel). Thus, user application software requires particular programming to ensure that it is compatible with the characteristics of a given tape device. This may require the modification of existing software to improve tape drive performance. Many programmers use the Unix system buffer mechanism to provide a buffered environment. However, this mechanism was originally designed for use with random access devices. So, by virtue of the limitations that it places on various types of tape formats, it is not entirely suitable for tape drive use.

Additional system integration problems are caused by the large number of disk device driver configurations which are necessary to support a variety of disk controllers. In a typical Unix system, the kernel must be customized (i.e. relinked followed by a system reboot) to select a specific disk device driver and disk unit to be used as a root file system (i.e. the point of growth for all other files in the file system) and as a swap file system (i.e. the location where memory images of programs which have been temporarily swapped out of memory are stored). This process of customizing the boot disk driver must be performed on a fully installed system and must be completed before the system may be used.

Typically, during the development of a Unix operating system, a separate operating system kernel is created for each possible configuration of peripheral devices. These kernels are built in advance and result in a potentially large number of kernels to accommodate the variety of supported disk controllers. Some vendors provide a large number of Unix kernels, allowing the user to chose the one appropriate for his system configuration at installation. Other vendors simply require that a given type of controller exist as the controller for the boot disk.

SUMMARY OF THE INVENTION

In the present invention, a common peripheral device interface module is disclosed which is flexible enough to support many types of peripheral device drivers. The interface module is capable of handling all application and operating system interfaces which have previously been performed by each device driver. For disk devices, this results in the following advantages:

1. New application interface features can be added to all drivers by only changing the common disk module.

2. Changes in the Unix operating system interface can be made to all drivers by only changing the common disk module.

3. By implementing all the interface features in the common disk module, complete application compatibility is obtained for all disk device drivers.

4. Implementation and debug of new disk device drivers is greatly simplified.

5. Duplicated code is avoided, thus reducing the overall kernel size.

6. The common disk module routines can be highly optimized to improve overall disk subsystem performance.

For tape drive devices, a supplemental high performance buffering scheme is provided. In addition, a state machine based design for sequential access tape devices is used. This design allows the common tape drive interface module to prevent the tape drive device driver from issuing commands which are invalid for the current state of the tape drive. This is accomplished by validating all user-requested tape operations based on the current state of the tape drive before the commands are issued. For tape devices, this results in the following advantages:

1. Tape performance may be greatly improved without specially tuning the individual applications programs.

2. New application interface features may be added to all drivers by changing only the common tape module.

3. Changes in the Unix operating system interface may be made to all drivers by changing only the common tape module.

4. By implementing all of the interface features in the common tape module, complete application compatibility is assured for all tape device drivers.

5. Implementation of new tape device drivers is greatly simplified.

6. Duplicated code is avoided, thus reducing the overall kernel size.

7. The Common Tape Module routines may be highly optimized to improve overall tape subsystem performance.

8. Tape buffering may be tuned at run time without system reboots or kernel customization. This may greatly speed up the process of tuning the buffering scheme to accommodate a new type of tape drive.

Because of the large number of possible root disk device drivers, the root disk device driver can be dynamically selected for the Unix operating system. This allows a single Unix kernel to be released which will boot on a variety of supported disk controller configurations. The following advantages are thus realized:

1. No kernel customization is required to specify root disk device drivers.

2. A single Unix kernel can be released for use on systems having different types of root disk controllers.

3. New bootable disk drivers can easily be added without changing any other parts of the kernel source code.

In the disclosed embodiment of the present invention, a common peripheral device interface module is described for use with a Unix - like operating system. This interface is flexible enough to support many types of peripheral device drivers. A common disk module (CDM) is included. The CDM contains high level disk operation routines which may be used for common reference to each disk drive on the system. Routines within the CDM are accessed by the specific device driver or device drivers. The CDM routines, in turn, call routines in the preexisting disk I/O subsystem of the Unix operating system. Additionally, the CDM routines call a group of low level routines which have been incorporated into each disk device driver. These routines communicate directly with the controllers for the specific disk drives.

As in disk drive systems, a common tape module (CTM) is used to improve the performance and flexibility of the tape I/O system. The CTM contains high level tape operation routines which may be used for common reference to each tape drive on the system. The routines within the CTM are accessed directly by the specific device driver or device drivers. The CTM routines, in turn, calls a group of low level routines which have been incorporated into a device driver. These routines communicate directly with the controllers for the specific tape drives.

Because of the large number of possible root disk device drivers (i.e. primary disk controllers), the root disk device driver can be dynamically selected for the Unix operating system. Each disk device driver having a controller which is resident within the system signals the boot device driver that it is present. The driver which checks in first with the boot device driver is used for the root and swap device of the system. This scheme allows a precedence ordering of the controllers to be used for considering which controller should be used in a system having multiple controllers.

BRIEF DESCRIPTION OF THE DRAWINGS

FIGS. 2, 2A and 2B are a flow chart diagram which illustrate the operation of the disclosed invention while reading from a disk.

FIGS. 13, 13A and 13B are a flow chart diagram which illustrate the operation of the Unix IOCTL System Call for the SQ tape driver.

DETAILED DESCRIPTION

Figure 1A:
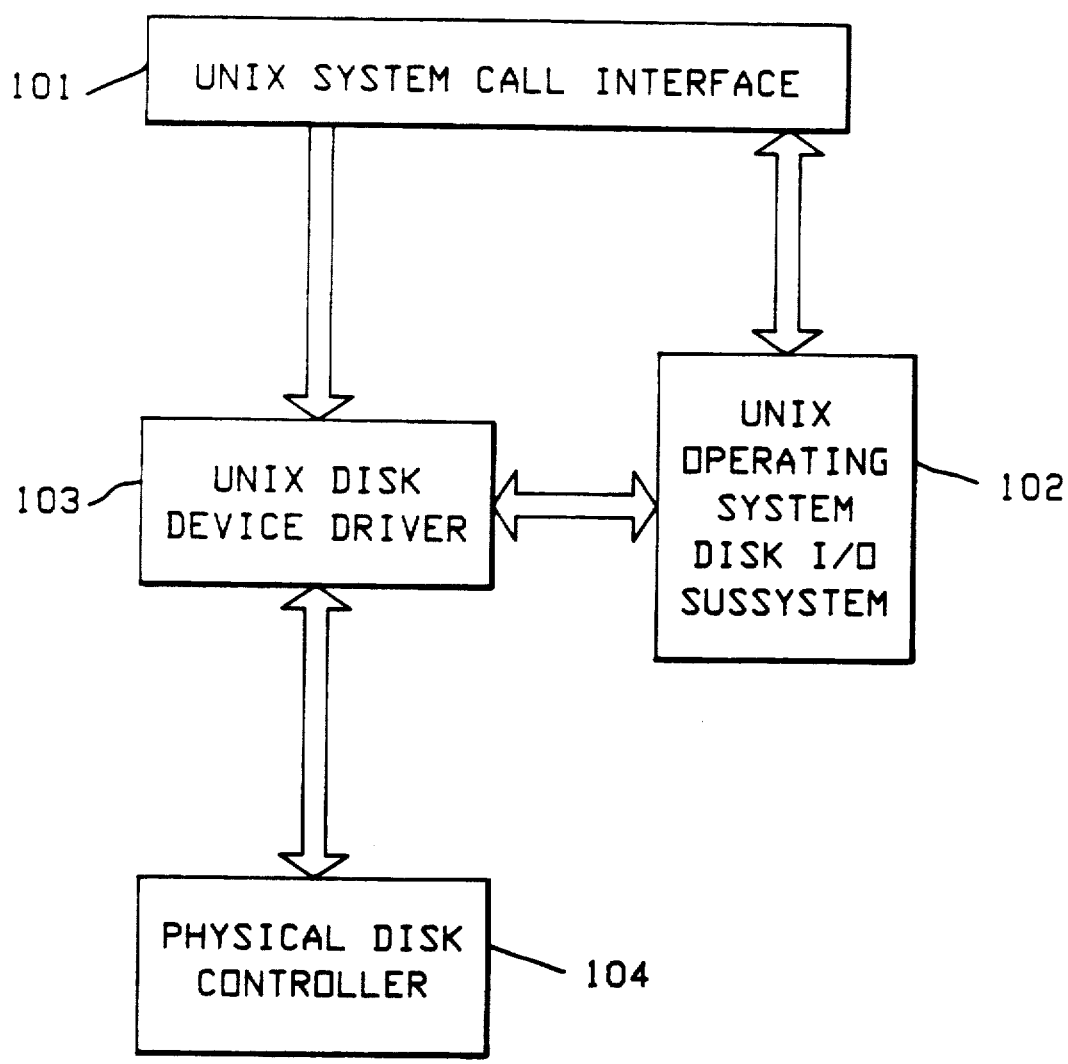
FIG. 1A is a block diagram showing the software configuration of a prior art Unix operating system for disk drive device drivers.

FIG. 1A is an illustration of the prior art with respect to disk device drivers for the Unix operating system. The Unix system call interface 101 provides user available Commands which request kernel operations. The operations allow user programs to access disk devices. A group of lower routines, which contain algorithms to do operating system related tasks required for access to the disk devices is found in the Unix operating system disk I/O subsystem 102. These routines interface with, and are used by a specific disk device driver 103. The device driver 103 communicates directly with the disk controller 104. The operation of the Unix operating system, depicted in FIG. 1A, is more fully described in a book by Shaw et al., entitled *Unix Internals*, Tab Books, 1987, incorporated by reference herein.

Figure 1B:
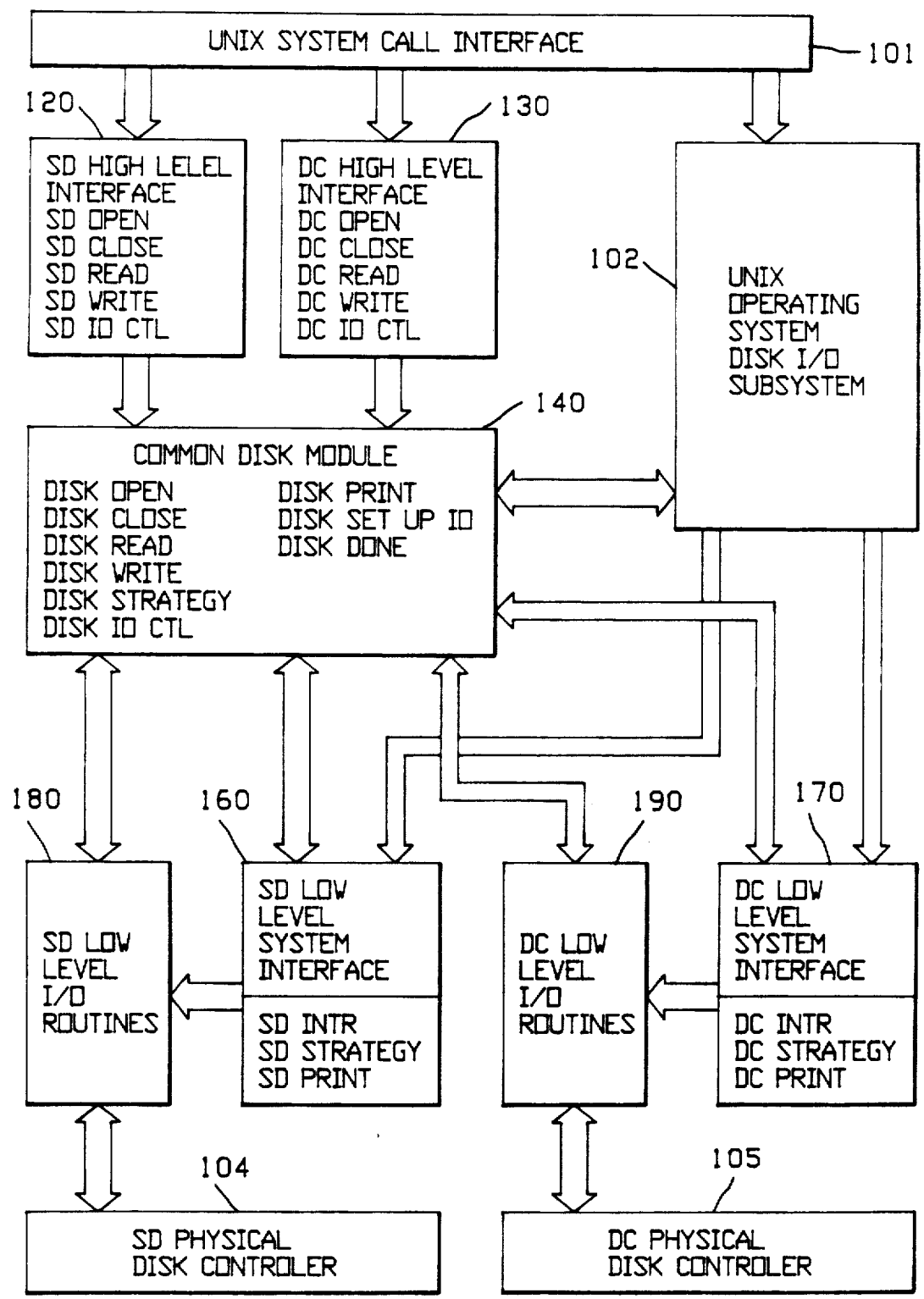
FIG. 1B is a block diagram showing the software configuration of the disclosed invention for utilizing disk drive device drivers.

FIG. 1B shows an exemplary embodiment of the present invention. This FIGURE illustrates the relationship between the common disk interface module and the Unix operating system. Unix disk operations (including input and output) are initiated through the Unix system call interface 101. The Unix system call interface, as in the previous FIGURE, is used to request operating system services. When a system call is initiated, the Unix system call interface maps I/O requests to the appropriate disk device driver. Separate operating system interface points 120 and 130 are used for each type of disk controller in the system. The proper interface point is selected by converting a device name to a device number (i.e. through device node entries found in the /dev directory). After the appropriate operating system interface points have been selected, these interface points call the proper routines within the common disk module. The majority of program code is found within the common disk module 140 (leaving a relatively small amount of coding to be incorporated into the operating system interface points of the disk device driver).

The common disk module 140 provides a group of routines which interact directly with the actual device drivers and with the Unix disk I/O subsystem 102. In the exemplary embodiment two disk drivers are shown, an SD disk driver which includes the SD high level interface 120, the SD low level interface 160 and the SD low level I/O routines 180; and a DC disk driver which includes the DC high level interface 130, the DC low level interface 170 and the DC low level I/O routines 190. Separate disk device drivers are used for each type of disk controller in the system.

The low level interface points 160 and 170 each includes a interrupt routine (INTR) to handle controller I/O completion and status interrupts, a strategy routine (STRATEGY) which is called by the operating system to initiate I/O and a print routine (PRINT) which is used for diagnostic error messages. These routines are called by the disk I/O subsystem 102 and by the common disk module 140. They make use of routines within the common disk module to perform their functions. These routines also communicate directly with their respective physical disk controllers 104 and 105.

The implementation of source code for the disclosed invention is readily apparent to one skilled in the art of Unix operating system design from the discussion of the disk I/O system, presented below. A copy of source code, partly in the form of pseudo code, which corresponds to a preferred embodiment of the disclosed invention is included in the appendix to this specification.

To provide a further understanding of the operation of the common disk module, a typical disk read operation is described with reference to FIG. 1B. First, a user program issues a read system call which is handled by the system call interface 101. The system call interface 101 maps this request to the appropriate operating system interface routine, SD READ. SD READ, in turn, makes use of the routine DISK READ within the CDM 140 to perform I/O verification (i.e. valid I/O size and offset) and to set up the I/O operation. The SD STRATEGY routine within the low level system interface 160 is then called to request the device driver to schedule an I/O operation, based upon the seek optimization algorithm for that type of disk. The routine SD STRATEGY invokes the routine DISK STRATEGY, in the CDM 140, to perform most of the scheduling. Thus the I/O operation is scheduled (placed on a queue). When the physical controller generates an interrupt, the disk I/O subsystem 102 calls the routine SD INTR, one of the low-level interface routines 160. This routine indicates the completion of the prior I/O operation and initiates the next I/O operation from the queue. The SD low level I/O routines 180 and the routine DISK SETUP IO from the common disk module 140 are invoked to initiate the next I/O operation. When the I/O operation completes, the physical controller 104 generates an interrupt and the disk I/O subsystem 102 calls the routine SD INTR. SD INTR, in turn, invokes the routine DISK DONE in the common disk module 140 to indicate the completion of the I/O operation. The routine DISK DONE notifies the operating system and the user program that the I/O operation is complete through the disk I/O subsystem 102 and the system call interface 101.

Figure 2B:
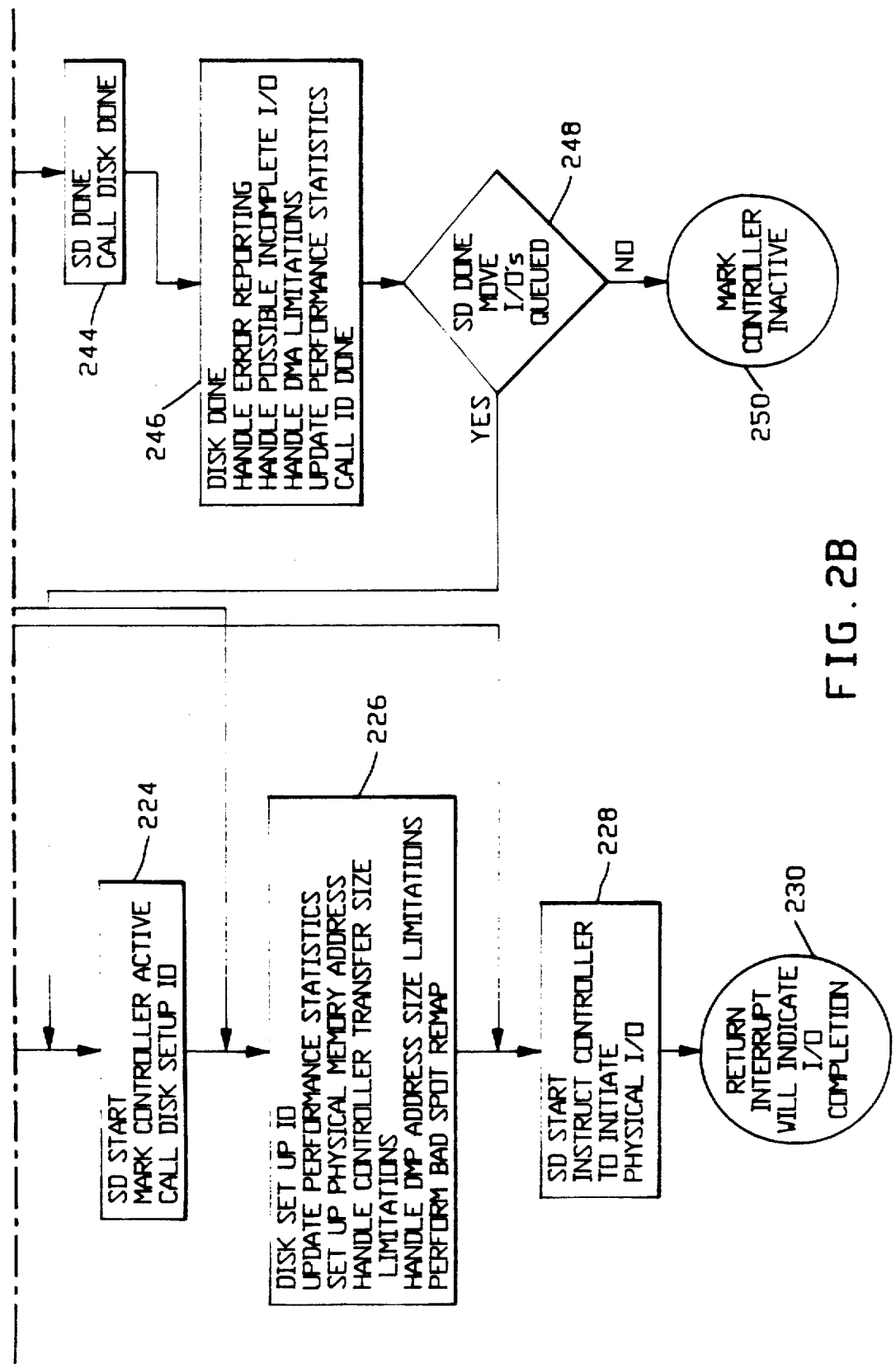

The flow chart diagram of FIG. 2 illustrates the operation of the disclosed invention while reading from a disk. At step 210, the operating system interface point SD READ calls the routine DISK READ within the common disk module 140. At step 212, the routine DISK READ is run. This routine performs the steps of verifying the size and offset of the I/O operation. This routine also invokes the routines PHYSCK and PHYSIO (each within the Unix operating system Disk I/O subsystem 102). PHYSCK is a standard Unix routine which verifies that a valid virtual address is being used for a user's data transfer request. PHYSIO is a standard Unix routine which handles paging (i.e. virtual memory) issues that arise in data transfer between user address space and the disk. At step 214, control is passed to the routine SD STRATEGY (within the low-level interface routines 160) which calls the routine DISK STRATEGY (within the CDM 140). This routine performs the steps of validating the I/O location (i.e. the target address within the target partition), mapping this I/O location to a physical block number, determining the cylinder on the disk, calculating the number of sectors that will be accessed, checking for bad spots on the disk, and updating various performance statistics. At step 218, using SD STRATEGY, the request to perform the disk access is added to the disk I/O queue. At step 222, the controller is examined to determine whether it is in an active state (i.e. whether an I/O operation is in progress). If it is, then, at step 220, the SD STRATEGY routine returns control to PHYSIO, allowing a future interrupt to initiate the I/O operation from the queue. Otherwise, at step 224, the controller is marked as being active and the routine DISK SETUP I/O (within the CDM) is initiated. At step 226, DISK SETUP I/O updates performance statistics, and sets up the physical memory address for a data transfer. Controller transfer size limitations are also handled by DISK SETUP I/O in addition to DMA address/size limitations. DISK SETUP I/O also performs bad spot remapping. At step 228, control returns to the routine SD START. At this step, the physical I/O operation is initiated by transferring the physical location of the requested access to a particular device. The physical location may be expressed in terms of head, cylinder and sector. Finally at step 230, SD START returns control to the operating system, allowing a future interrupt to signal that the I/O operation has been completed.

At step 232, the effects of a controller interrupt are shown. A controller interrupt occurs at the completion of an I/O operation. The initial result of the detection of a controller interrupt is for the routine SD INTR (within the low level interface routines 160 of the SD Device Driver) to be initiated. This includes the steps of checking the status of the controller and physical disk drive.

At step 236, the controller status is evaluated to determine whether or not there is an error condition. If an error condition is detected, then, at step 238, the controller status and disk driver status are checked to determine whether the physical I/O operation should be retried. If the operation should be retried, then, at step 240, program control switches to step 228 in which the physical I/O operation is initiated again as previously discussed. Otherwise, control is switched to step 244 in which the routine DISK DONE (within the CDM 140) is initiated. The DISK DONE routine is also initiated if a user request is successfully completed as shown at step 242. It is noted that if the user request is not completed, then program control switches to step 226, previously discussed. Step 246 represents the invocation of the routine DISK DONE. This routine performs the steps of reporting any errors that may have occurred, handling possible incomplete I/O operations, handling DMA limitations, and updating performance statistics. Finally the standard Unix routine IO DONE is initiated from within the Disk I/O subsystem 102 to report the completion of the I/O operation.

Next, at step 248, the routine SD DONE is invoked to check the queue to determine whether more I/O operations are pending completion. If more operations are pending completion, control switches to step 224, previously discussed. Otherwise, at step 250, the controller is marked as being inactive and control is returned to the program which was interrupted at step 232.

As shown in FIG. 1B, the operating system interface is capable of performing the routines SD OPEN and SD CLOSE. SD OPEN is shown in detail in FIG. 3. SD CLOSE is shown in detail in FIG. 4.

Figure 3:
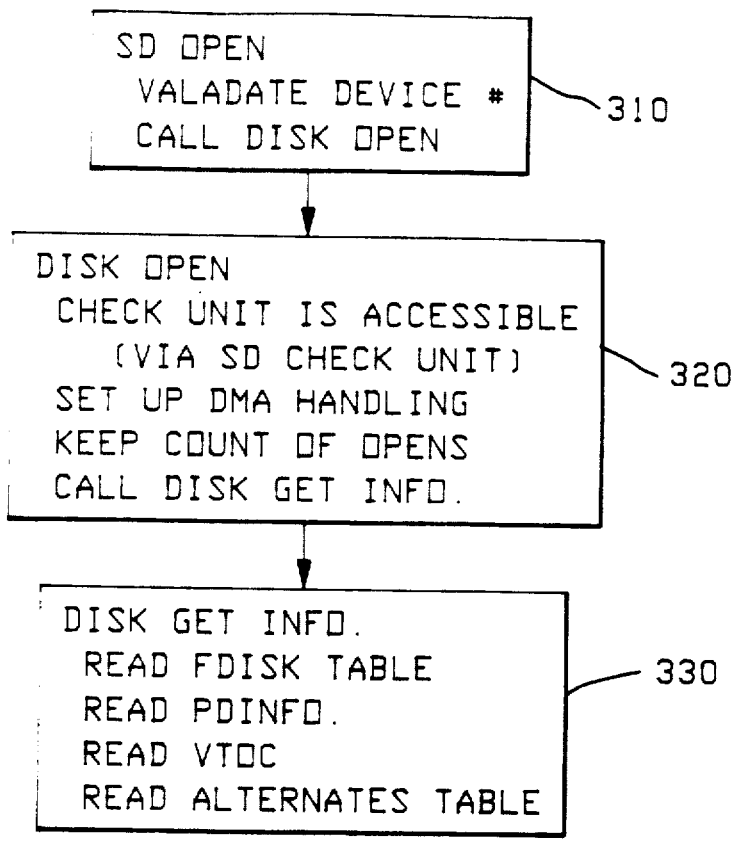
FIG. 3 is a flow chart diagram which illustrates the operation of the disclosed invention while opening a disk device driver.

As a first step in opening a disk device driver, as shown in FIG. 3, the routine SD OPEN is initiated from the system call interface 101 at step 310. This routine performs the functions of validating the device number and calling the routine DISK OPEN within the common disk module 140. The DISK OPEN routine, shown at step 320, includes the steps of checking the I/O unit to determine whether or not it is accessible, setting up DMA handling and keeping count of the number of times that the disk drive has been opened by users.

At step 330, the routine DISK GET INFO is called. This routine invokes a group of low level routines including READ FDISK TABLE (used for disk partitioning between DOS and UNIX), READ PD INFO (obtaining various physical disk parameters from a predetermined disk sector), READ VTOC (obtaining the table of contents for disks that have multiple partitions) and READ ALTERNATES TABLE (for bad spot remapping).

Figure 4:
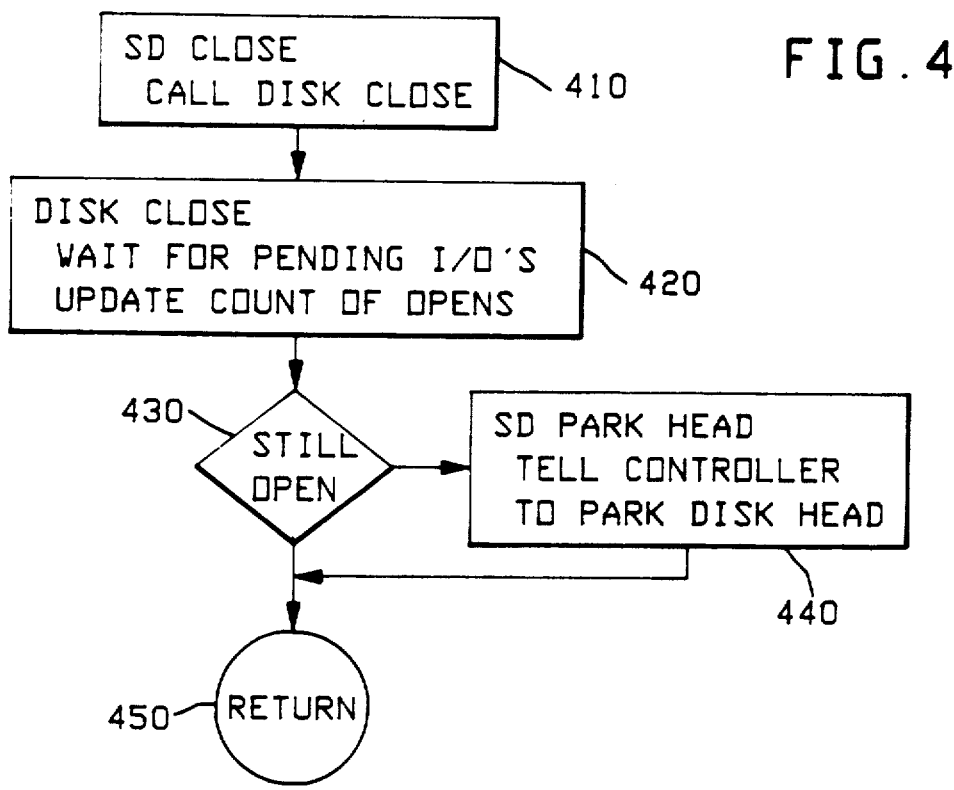
FIG. 4 is a flow chart diagram which illustrates the operation of the disclosed invention while closing a disk device driver.

When a disk device drive is no longer needed by a user program, the routine SD CLOSE is called from the Unix system call interface 101 as shown in step 410 of FIG. 4. SD CLOSE calls the routine DISK CLOSE within the Common Disk module 140. At step 420, a wait for pending I/O operations occurs. The number (count) of users having the disk drive open is updated.

At step 430, a determination is made as to whether other users still have the disk drive open. If no other users currently have the drive open, then, at step 440, the routine SD PARK HEAD is called, which conditions the controller to park the disk head, and at step 450 control is returned to the Unix system call interface 101 shown in FIG. 1. If, at step 430, the device is still held open by one or more other users, then at step 450 system control is returned to the Unix system call interface 101 without first parking the disk head.

Figure 8A:
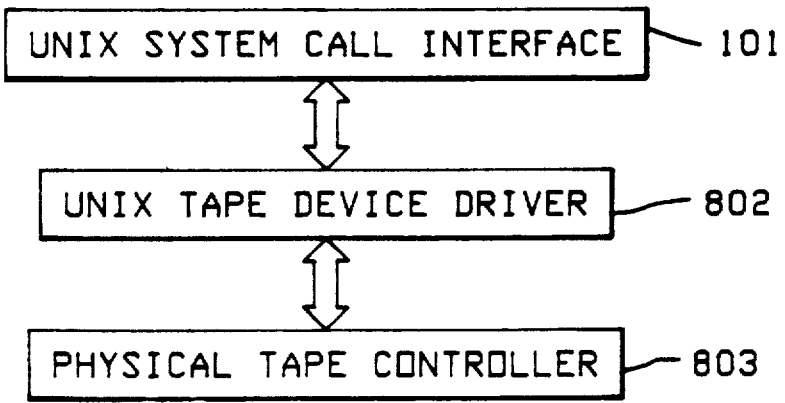
FIG. 8A is a block diagram showing the software configuration of a prior art Unix operating system for tape drive device drivers.

The basic concepts of the I/O system, shown in FIG. 1, are extendable to environments which use tape drive systems. Such an environment is demonstrated with reference to FIG. 8A and 8B. FIG. 8A illustrates the prior art with respect to the tape drive interface in the Unix operating system. Comparing FIG. 8A with FIG. 1A, it is noted that the Unix operating system does not include a tape I/O subsystem which would correspond to the disk I/O subsystem 102 of FIG. 1A.

Figure 8B:
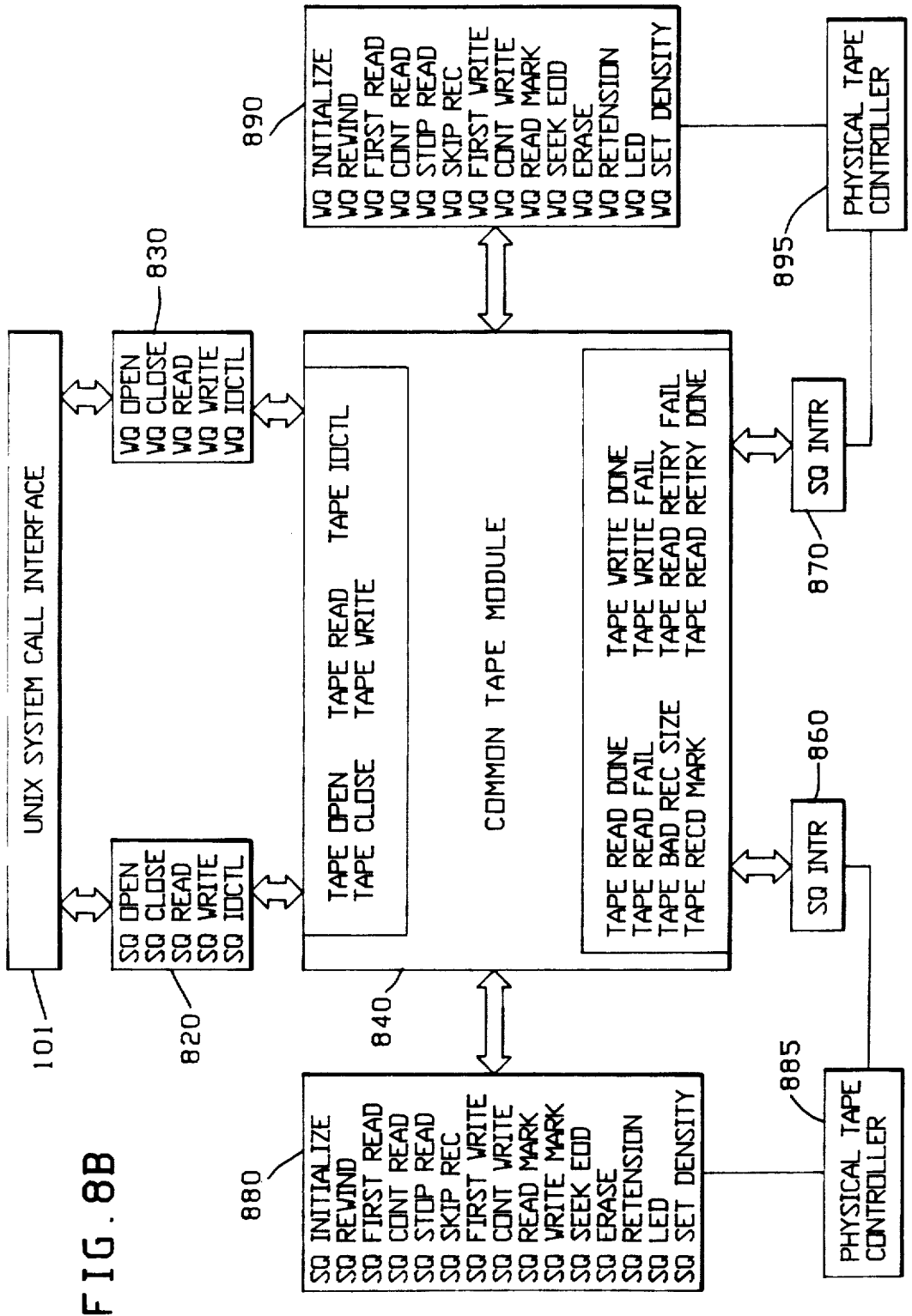
FIG. 8B is a block diagram showing the software configuration of the disclosed invention for using tape drive device drivers.

In the present embodiment of the invention, as shown in FIG. 8B, a Unix system call interface 101 calls the driver routines at one of the operating system interface points 820 and 830. Separate interface points are used for each respective type of tape drive device in the system. In the exemplary embodiment, two types of tape drive device, SQ and WQ are illustrated. The driver routines from both the SQ and WQ interface points make use of the Common Tape Module 840 to perform the majority of the tape status/handling functions.

The Common Tape Module routines call specific routines within the device drivers 880 and 890 to implement low level controller functions. Separate device drivers are used for each type of device. The device drivers 880 and 890 in turn communicate directly with tape drive controllers 885 and 895 to cause the I/O operations to occur.

It is noted that there is no tape I/O subsystem shown in this FIGURE. This is because the Unix operating system does not provide such a structure. The tape I/O subsystem is implemented individually for each specific device driver. Several exemplary tape drive routines are shown in the attached FIGS. 9-16.

Figure 9:
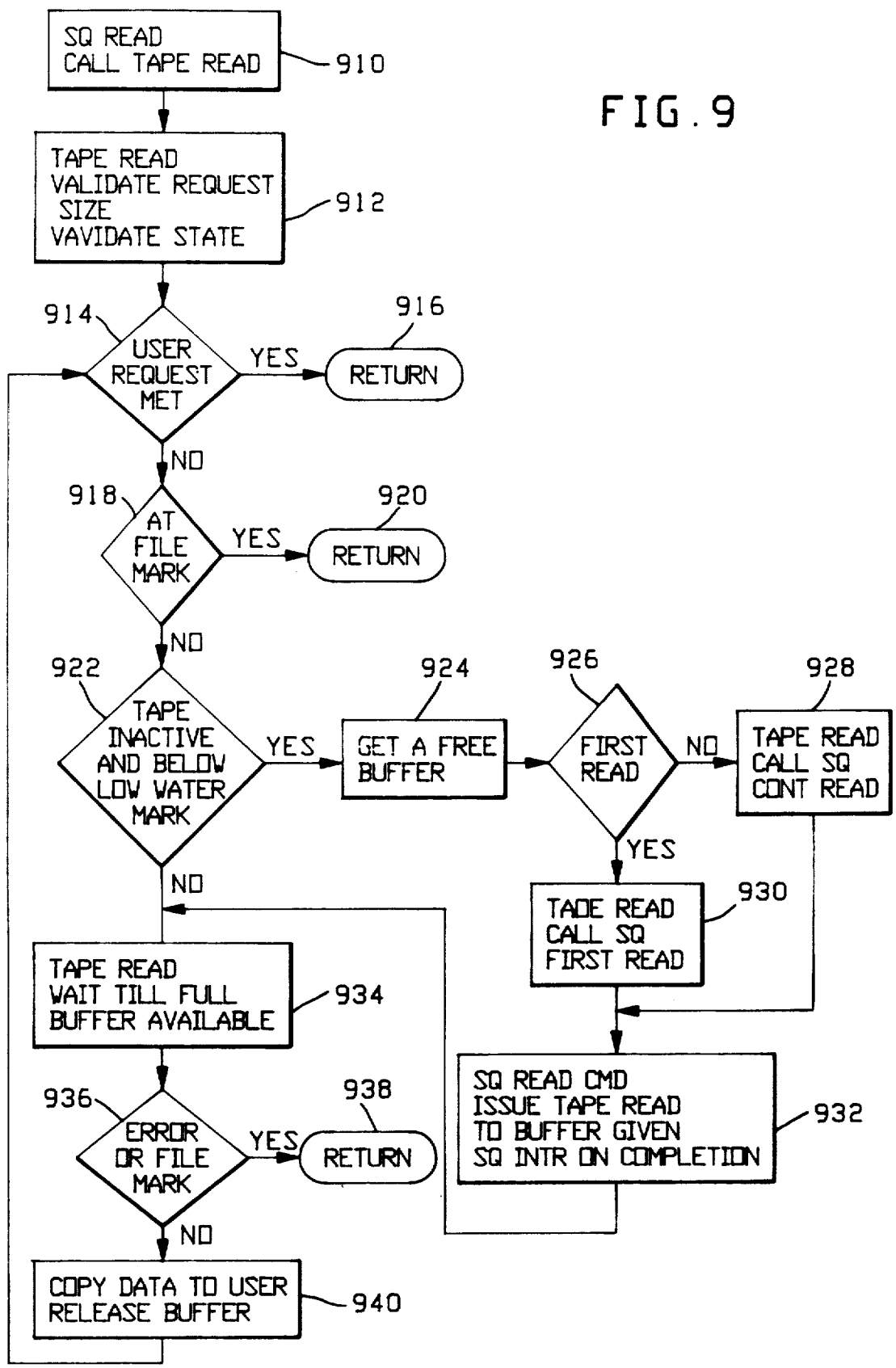
FIG. 9 is a flow chart diagram which illustrates the operation of the Unix Read System Call for an SQ Tape Driver.
Figure 10A:
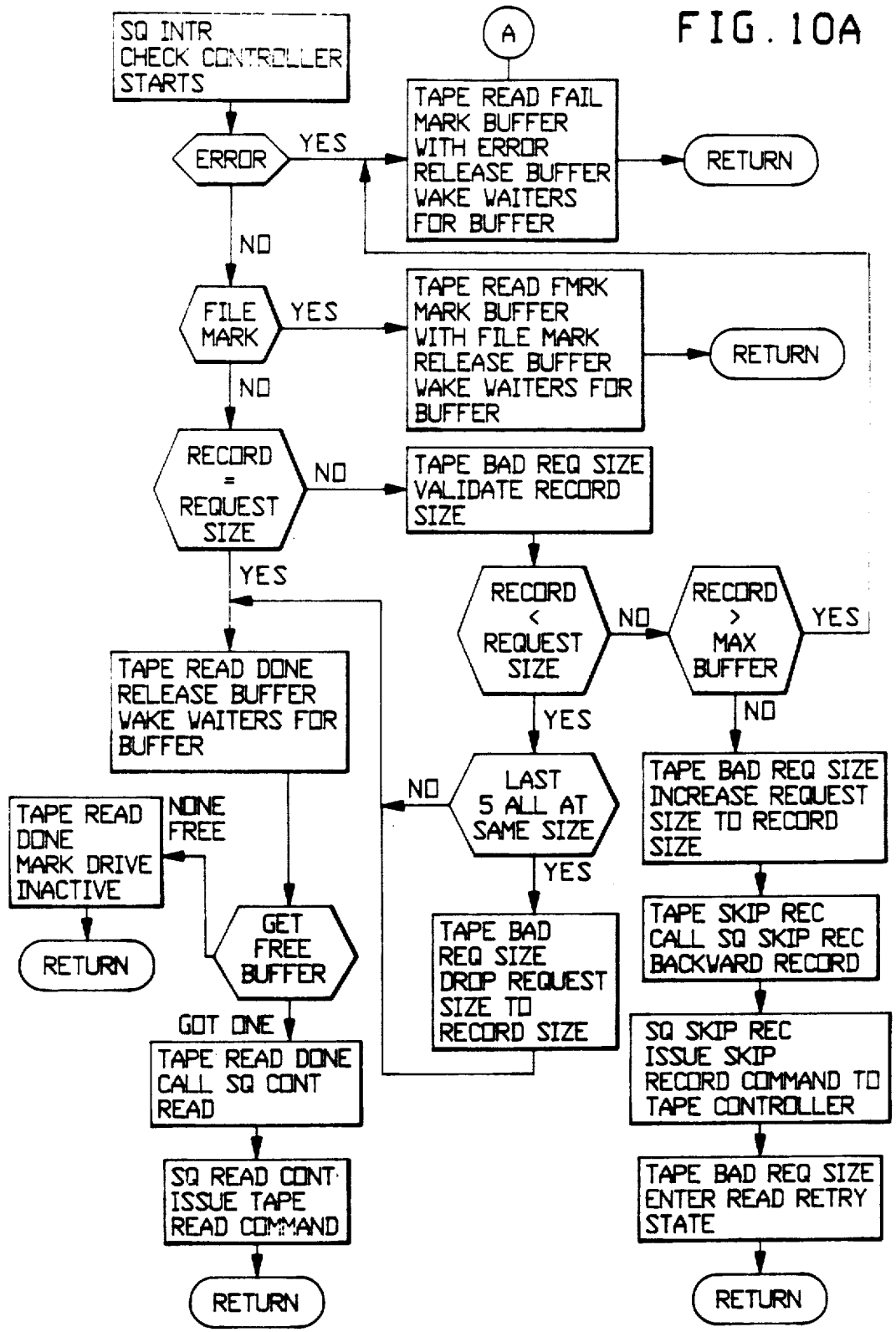
FIG. 10A is a flow chart diagram which illustrates the operation of the routine SQ INTR in the reading state.
Figure 10B:
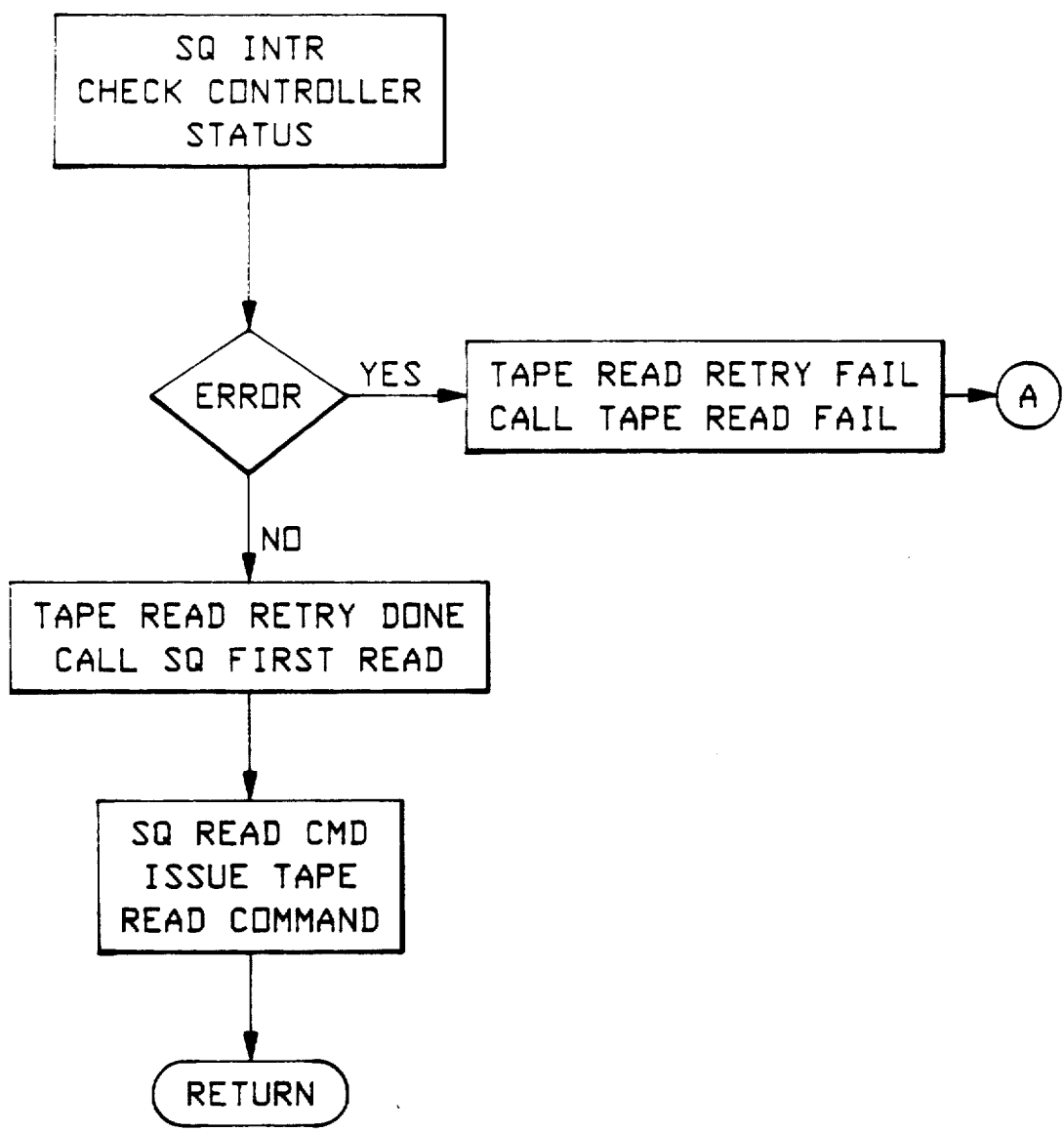
FIG. 10B is a flow chart diagram which illustrates tie operation of the routine SQ INTR in the read-retry state.
Figure 11:
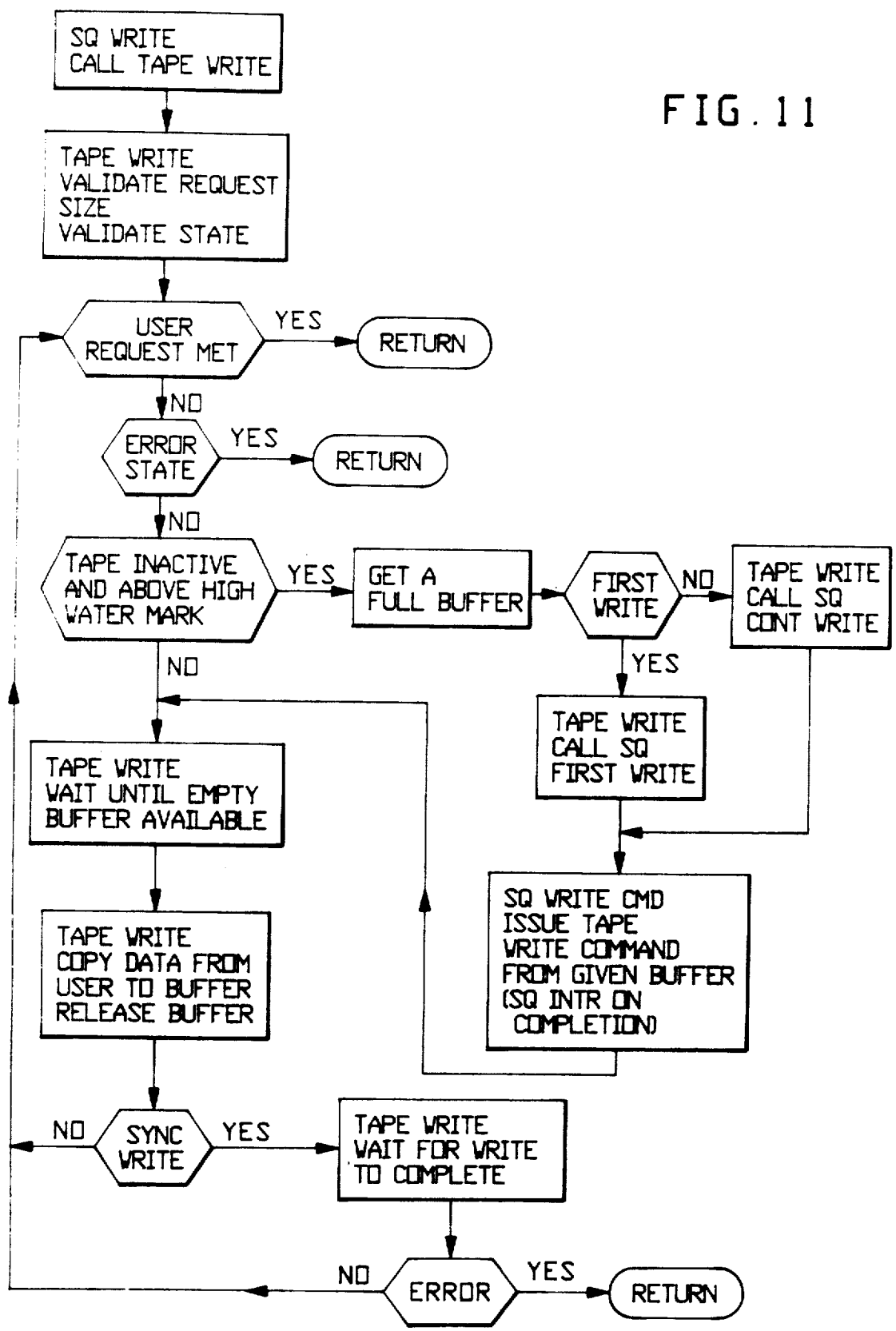
FIG. 11 is a flow chart diagram which illustrates the operation of the Unix WRITE system call for an SQ tape driver.
Figure 12:
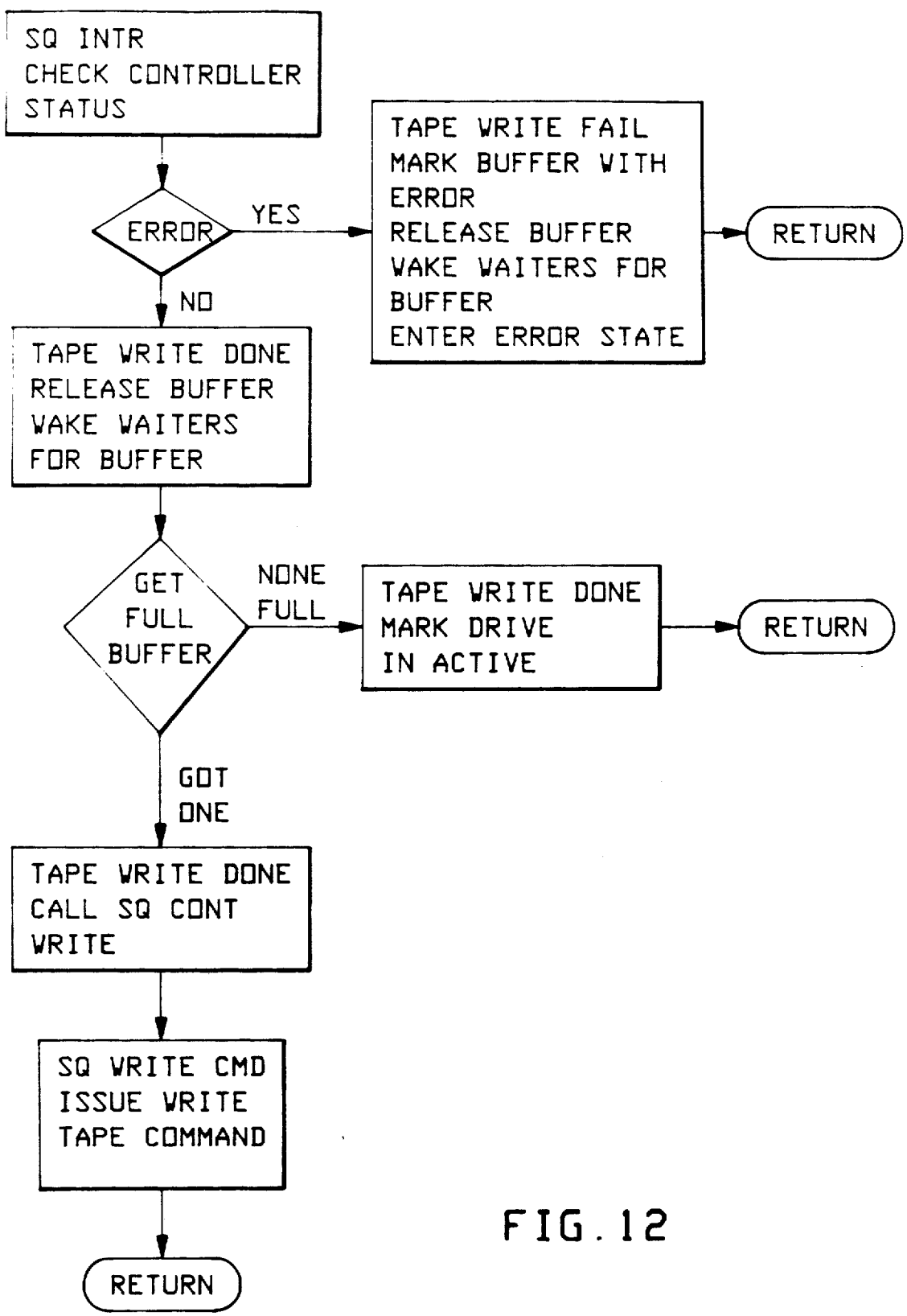
FIG. 12 is a flow chart diagram which illustrates the operation of the routine SQ INTR in the writing state.
Figure 13A:
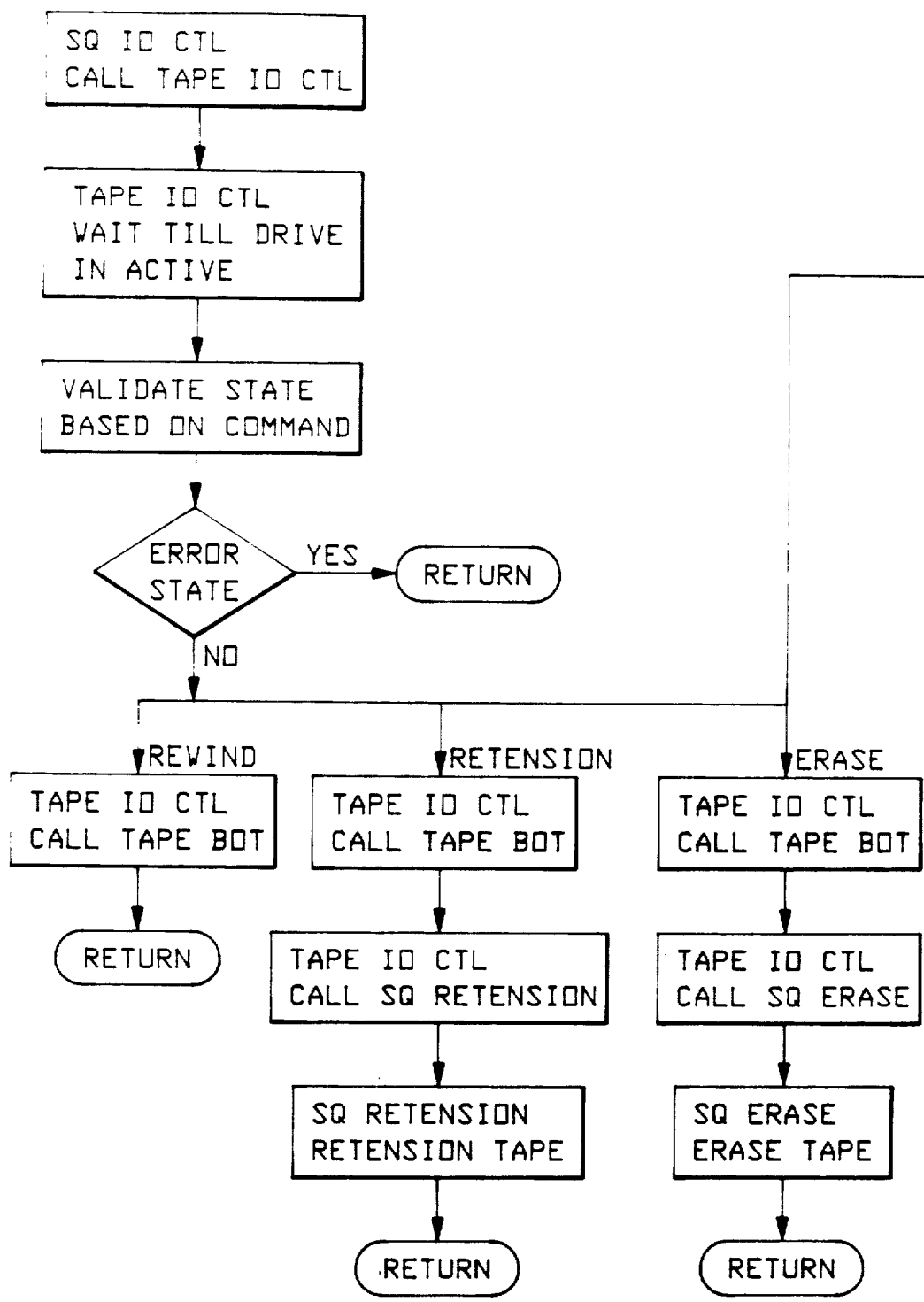
Figure 13B:
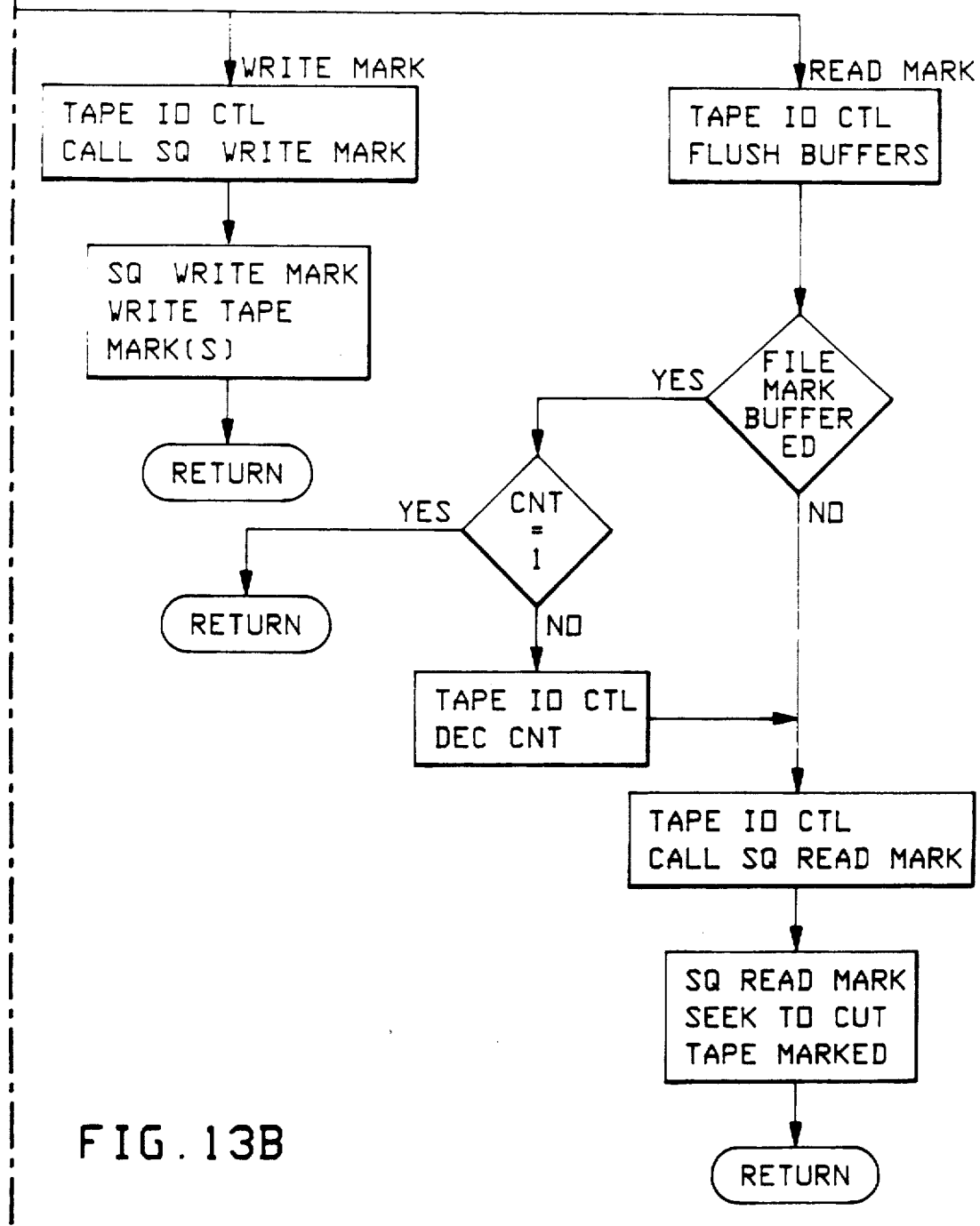
Figure 14:
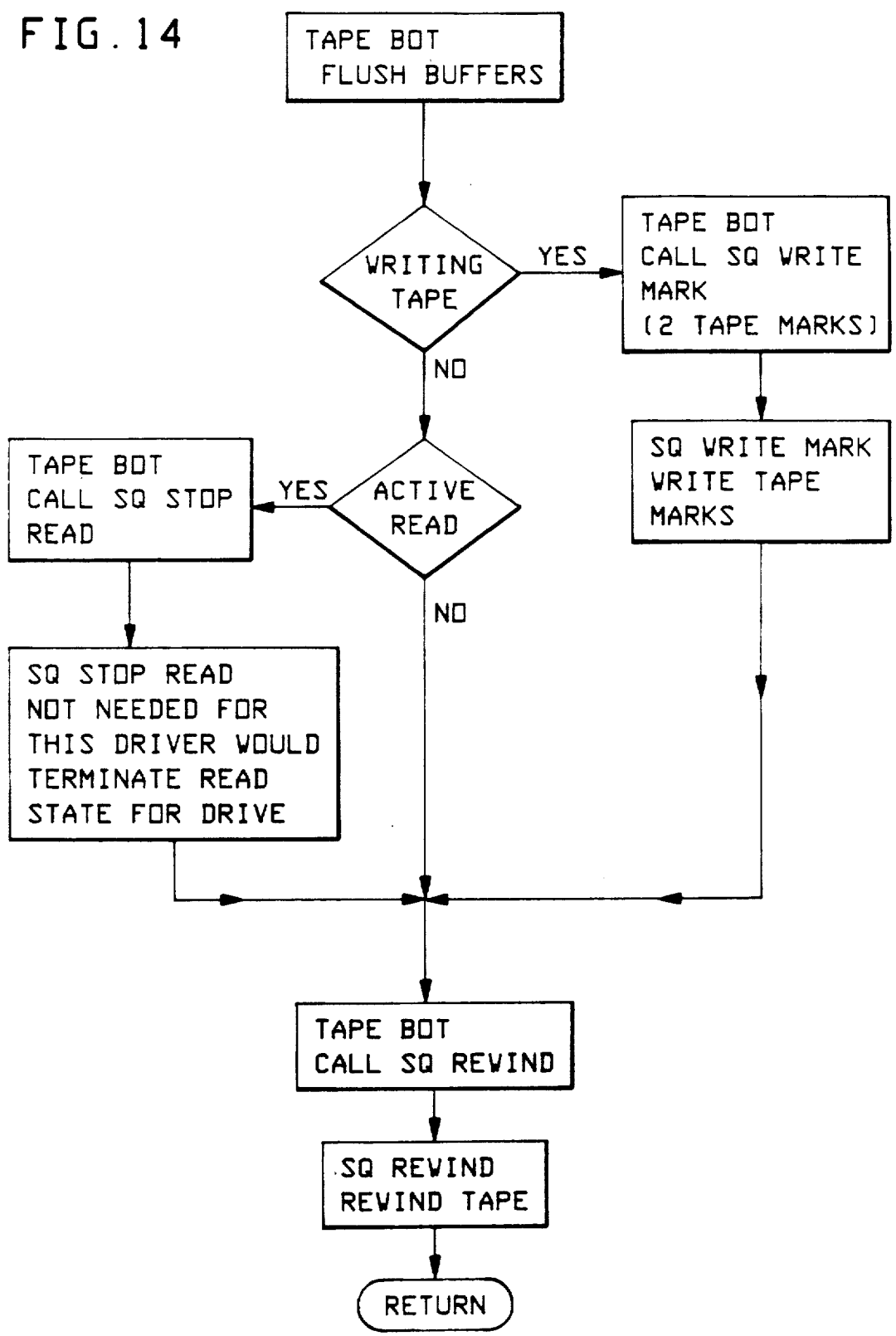
FIG. 14 is a flow chart diagram which illustrates the operation of the routine TAPE BOT for the Common Tape Module routine.
Figure 15:
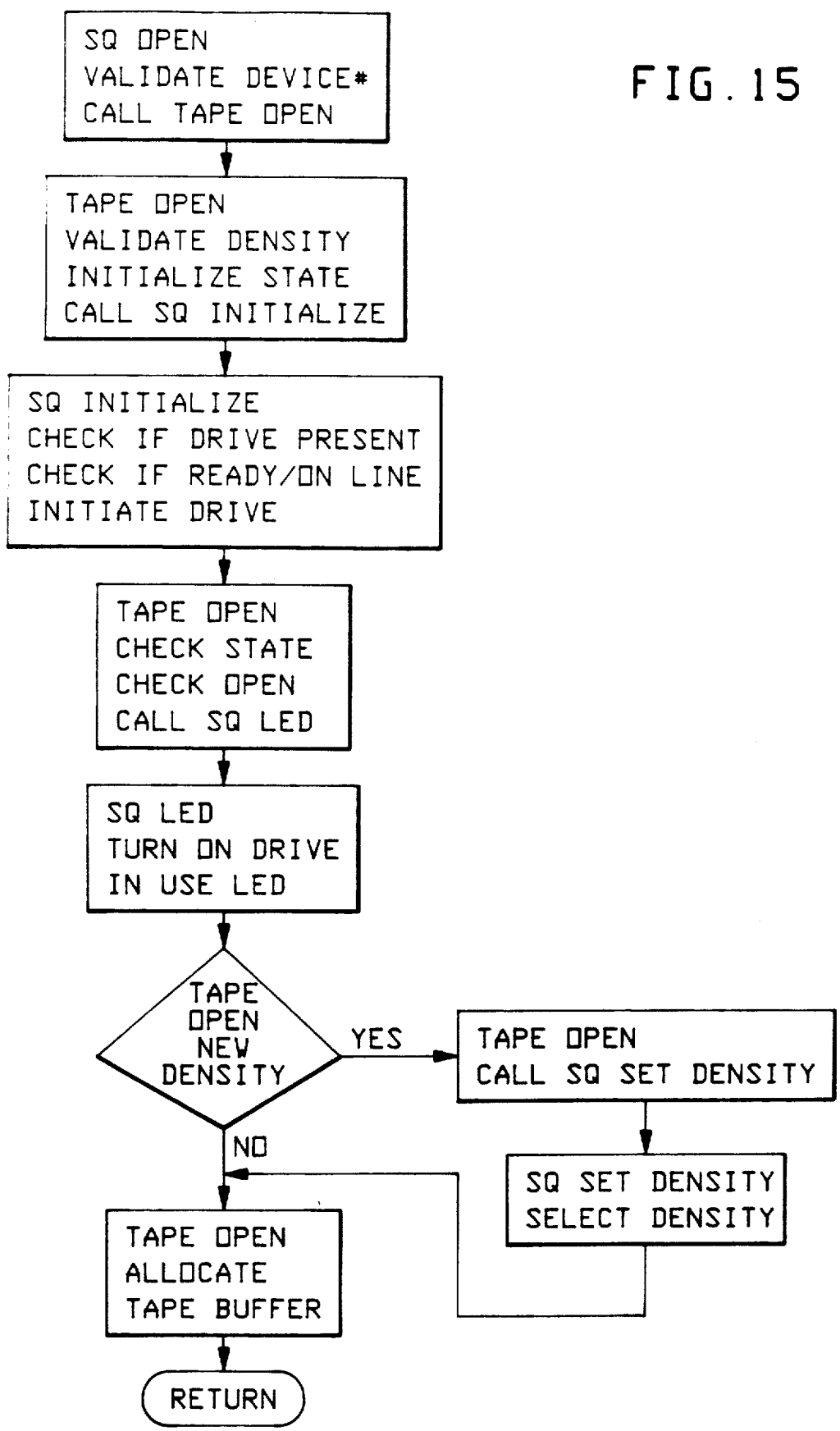
FIG. 15 is a flow chart diagram which illustrates the operation of the Unix OPEN system call for the SQ tape driver.
Figure 16:
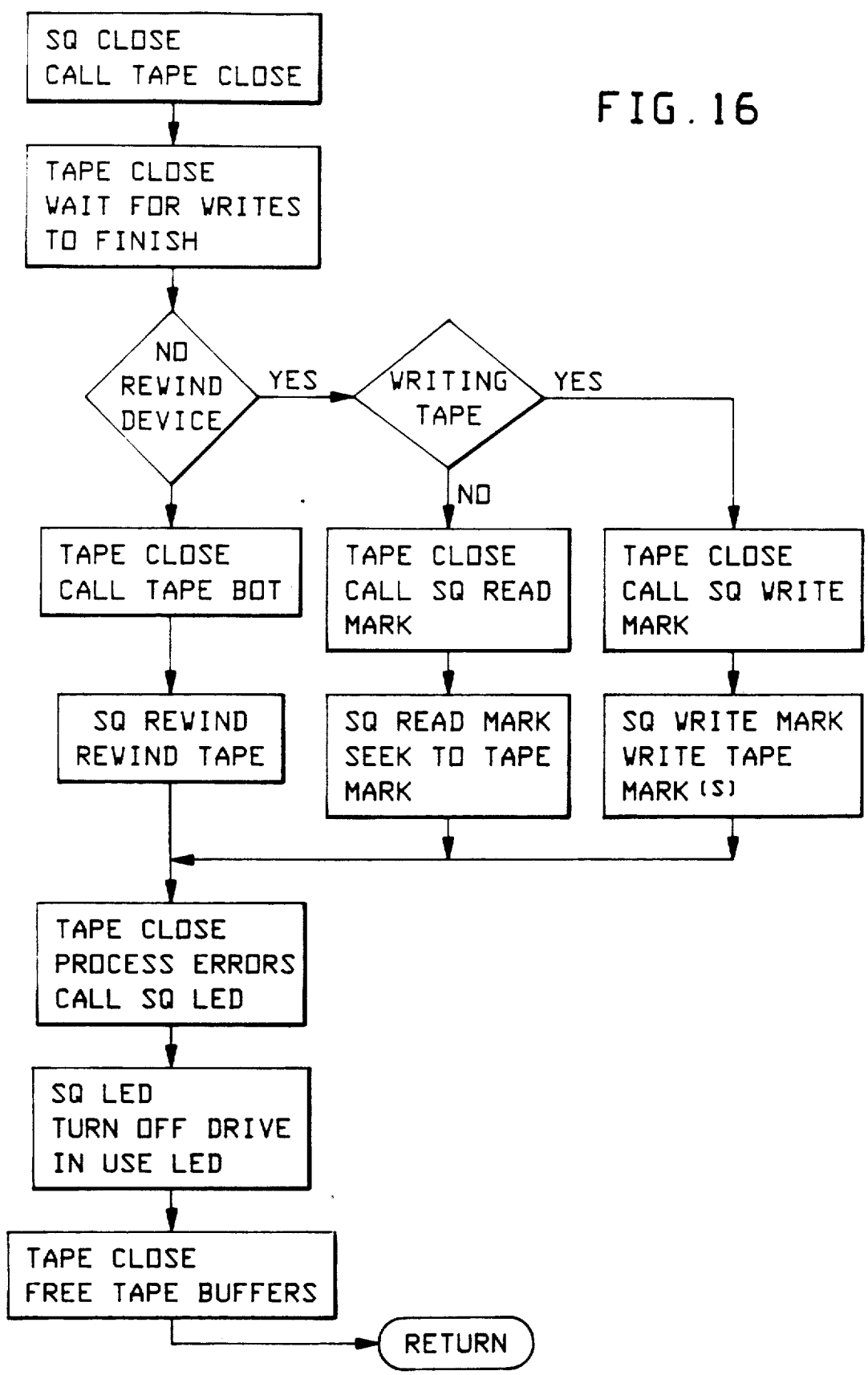
FIG. 16 is a flow chart diagram which illustrates the operation of the Unix Close System Call for the SQ tape driver.

A tape read system call for an SCSI tape device is shown in FIG. 9. At step 910, the routine SQ READ in the interface point 820 is invoked through the Unix system call interface 101 by a user request to read data from the tape device. The routine SQ READ, in turn, calls the routine TAPE READ in the common tape module 840. At step 912, TAPE READ validates the request size and validates the state of the tape device by referring to internal tables. Next, at step 914, the routine TAPE READ determines if the user request has been met. This step is a loop terminating condition which allows a single tape read call to request several buffers full of data from the tape device. If, at step 914, the user request has been satisfied, TAPE READ returns control to the system call interface 101 which returns control to the user program.

If, at step 914, the user request has not been met, step 918 is invoked to determine if the tape is positioned at a file mark. In this instance, no more data may be read from the tape and control is returned at step 920.

If the tape is not at a file mark, step 922 is executed to determine if the tape is inactive and the read-ahead buffered data which has been read from the tape is less than a predetermined amount i.e. the low water mark. If so, step 924 is executed to obtain a buffer from the free buffer list. At step 926, the routine TAPE READ determines if the requested read operation is the first for the tape device. If so, TAPE READ invokes the routine SQ FIRST READ in the device driver 880. Otherwise, TAPE READ invokes the routine SQ CONT READ in the driver 880. Next, at step 932, the routine SQ FIRST READ or the routine SQ CONT READ issues the tape read command to the controller for the tape device using the routine SQ READ CMD.

After issuing the read command at step 932 or if the tape device is found to be active at step 922, the routine TAPE READ waits until a full buffer is available. Due to the read-ahead nature of the buffer algorithms, a full buffer may already be available at step 934. If a full buffer is not available, TAPE READ will wait until an interrupt from the controller causes a full buffer to become available. This interrupt may indicate that the controller 885 has filled the buffer, that a file mark has been encountered or that the controller has encountered an error. In response to this interrupt, the data returned by the controller is stored into a buffer and the buffer is marked as being available. Step 936 determines if the buffer obtained indicates that the tape read operation terminated at a file mark or with an error. If so, at step 938, control is returned to the system call interface 101. Otherwise, if the tape read operation ended without exception, the requested amount of data is copied to the user data area and the tape buffer is released. At step 940 and control is transferred to step 914 to determine if the user request has been met.

The implementation of the TAPE READ routine and the routines SQ INTR, SQ WRITE, SQ IOCTL, TAPE BOT, SQ OPEN and SQ CLOSE, and are readily apparent, to one skilled in the art of Unix operating system design, from flow charts shown in FIGS. 10–16 and from the discussion of the disk I/O system, described above. Hence, a detailed description of these flow charts has not been included. In any case, a copy of source code, partially in pseudo code form, corresponding to a preferred embodiment of the disclosed invention is included in the appendix to this specification.

In an exemplary embodiment of the disclosed invention, a dynamic root disk selection method is used. This method allows the kernel to automatically configure itself for various types of controllers that may be present in a particular system. Thus, a Unix system using the exemplary embodiment of the invention may dynamically select its root disk device driver. This allows the release of a single Unix kernel, capable of being booted on any of a number supported disk controller configurations.

Disk drives and file systems are identified through the use of major numbers and minor numbers. A major number may be a reference to a particular device driver. This major number may then be used as an index into the appropriate switch table for device drivers. There are two switch tables: a block device switch table (BDEVSW) which contains pointers to drivers for all the devices using buffer caches, and a character device switch table (CDEVSW) which contains pointers to all the devices using either character buffers or unbuffered I/O. The minor number may refer to an individual device, i.e. a particular disk device that is being referred to on a given controller. Disk controllers may also have individual unit numbers (or device numbers).

Figure 5:
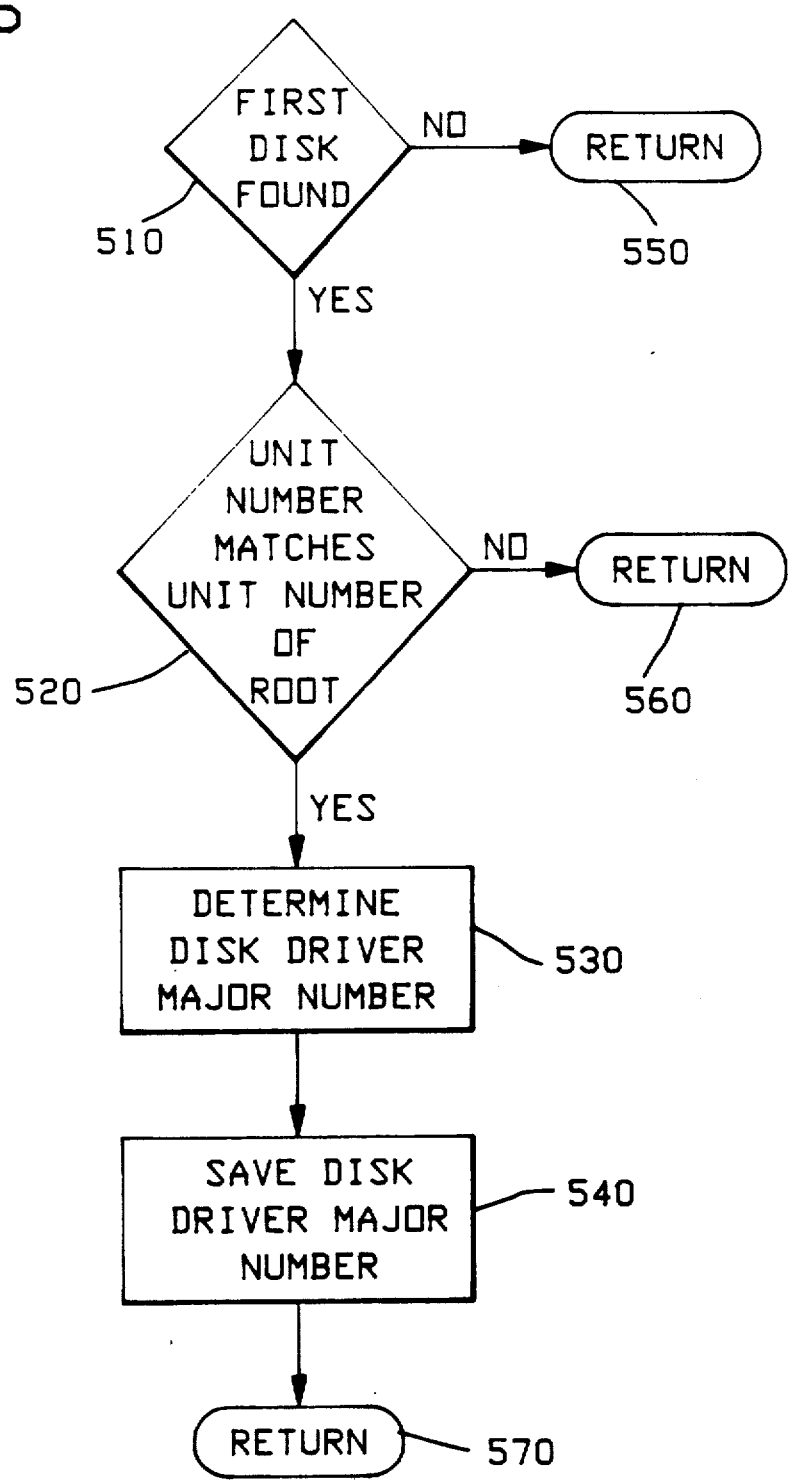
FIG. 5 is a flow chart diagram which illustrates the operation of the routine DISK FOUND being used for root drive selection.
Figure 6:
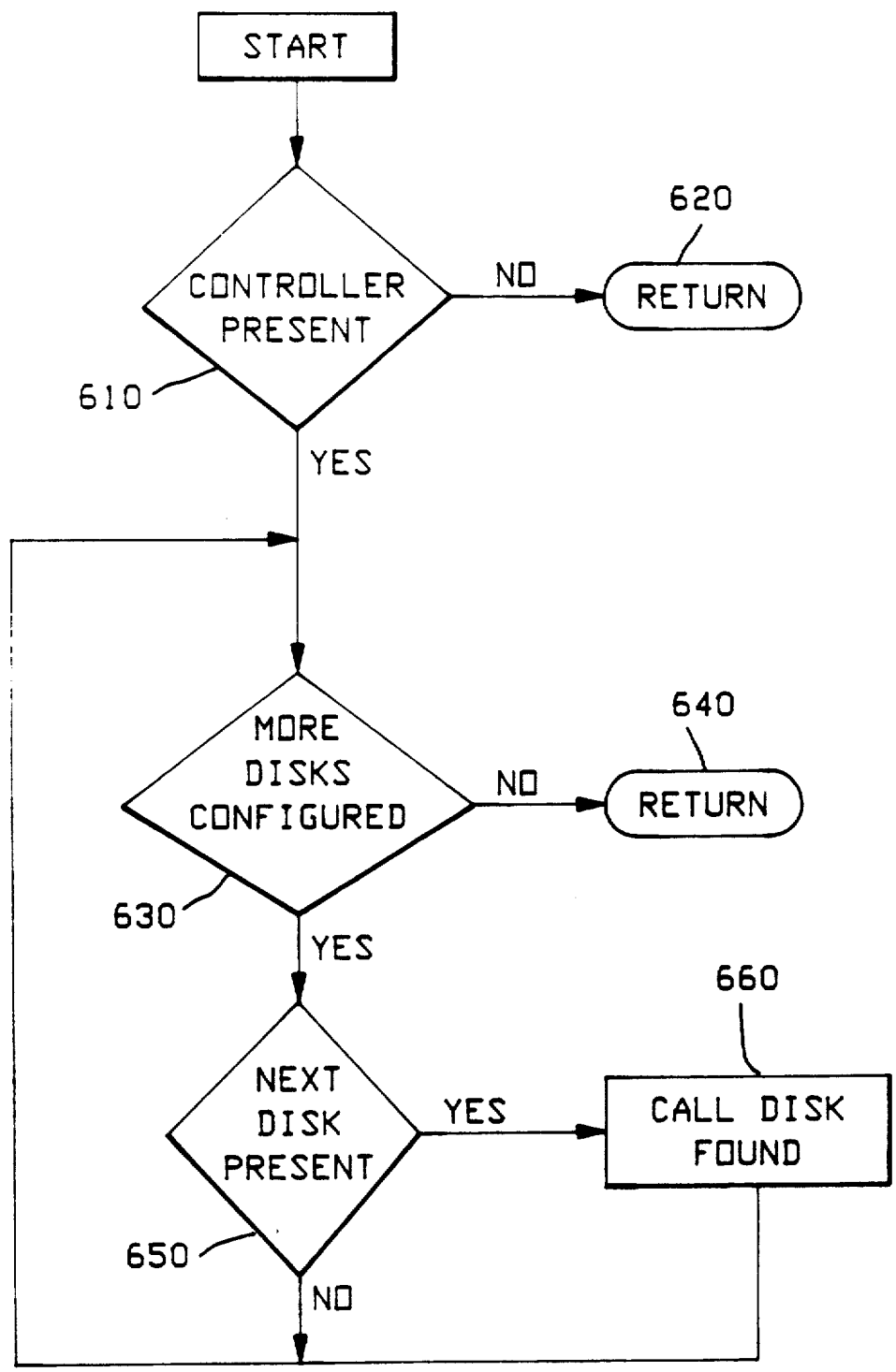
FIG. 6 is a flow chart diagram which illustrates the initialization processing for a specific disk device driver to interface with the root drive selection.
Figure 7:
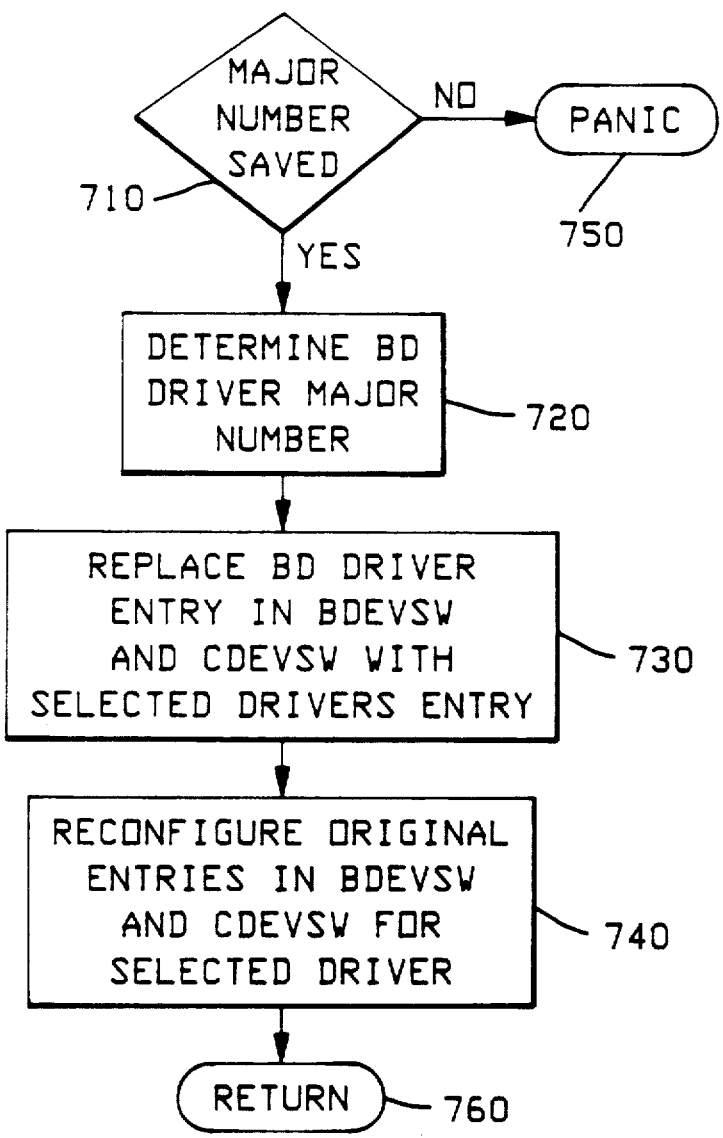
FIG. 7 is a flow chart diagram which illustrates the operation of the initialization routine for an exemplary disk device driver which is used in root drive selection.

As shown in FIG. 6, each disk device driver has an initialization routine. This routine is run very early in the Unix boot process. At step 610, The initialization routine first determines if its disk controller is present and functioning, for example, by running some simple diagnostic tests of the controller. If the controller is not present or is not functioning, the initialization routine has nothing to initialize so it returns at step 620. The initialization routine then enters a loop testing for the presence of each configured disk. For each disk which is present, the routine DISK FOUND is called at step 660. As shown by the flow chart of FIG. 5, the DISK FOUND routine saves the major device driver number for the first disk controller which is identified by the DISK FOUND routine, provided that the disk has a unit number that matches the minor number assigned to the root file system disk. As shown in FIG. 7, step 710, the boot disk (BD) driver initialization routine confirms that a controller was found for the root disk as indicated by DISK FOUND having saved a major device number. If a controller was not found, then at step 750, the system panics. Otherwise at step 720, the Boot Disk (BD) driver major number is determined. In addition, at step 730 the Unix BDEVSW and CDEVSW tables are updated to replace the BD driver entry with the selected root disk driver major number (i.e. the major number saved by DISK FOUND). The previous root disk driver entries within the BDEVSW and CDEVSW tables are then removed (step 740). Thus, the original device driver entries are disabled to ensure that the device driver is not opened multiple times with different major device numbers.

Since the first driver initialization routine to discover a present disk will be configured as the root disk driver, the customization order for running the initialization routines determines the selection order for disk device drivers. This configuration should match the order in which the boot ROM considers controllers.

While the invention has been described in terms of an exemplary embodiment, it is contemplated that it may be practiced as outlined above with modifications within the spirit and scope of the appended claims.

We claim:

1. Apparatus for transferring a plurality of input/output (I/O) requests between a Unix operating system and first and second block oriented I/O device controllers operating in accordance with respective first and second command sequences said apparatus comprising:
   a. Unix system call interface means for receiving ones of said plurality of I/O requests;
   b. operating system interface means, coupled to said Unix system call interface means, for receiving said plurality of I/O requests from said Unix system call interface means and for mapping ones of said plurality of I/O requests to an I/O routine;
   c. first and second device driver means, coupled to said first and second block oriented I/O device controllers, respectively, including means for providing commands and data in accordance with said first and second command sequences to said respective first and second block oriented I/O device controllers and means for receiving blocks of data from said respective first and second block oriented I/O device controllers; and
   d. common device module means for signalling said first and second device driver means to communicate with said respective block oriented I/O device controllers;

wherein each of said first and second block oriented I/O device controllers is a disk drive controller;

wherein said first and second device driver means each includes a disk I/O subsystem of a Unix operating system and wherein any interface protocol associated with the disk I/O subsystem of the Unix operating system is implemented in said common device module means.

2. Apparatus for transferring a plurality of input/output (I/O) requests between a Unix operating system and first and second block oriented I/O device controllers operating in accordance with respective first and second command sequences said apparatus comprising:
 a. Unix system call interface means for receiving ones of said plurality of I/O requests;
 b. operating system interface means, coupled to said Unix system call interface means, for receiving said plurality of I/O requests from said Unix system call interface means and for mapping ones of said plurality of I/O requests to an I/O routine;
 c. first and second device driver means, coupled to said first and second block oriented I/O device controllers, respectively, including means for providing commands and data in accordance with said first and second command sequences to said respective first and second block oriented I/O device controllers and means for receiving blocks of data from said respective first and second block oriented I/O device controllers; and
 d. common device module means for signalling said first and second device driver means to communicate with said respective block oriented I/O device controllers;

wherein each of said first and second block oriented I/O device controllers is a disk drive controller and wherein said common device module means transfers status information between the Unix system call interface means and said first and second device driver means.

3. Apparatus for transferring a plurality of input/output (I/O) requests between a Unix operating system and first and second block oriented I/O device controllers operating in accordance with respective first and second command sequences said apparatus comprising:
 a. Unix system call interface means for receiving ones of said plurality of I/O requests;
 b. operating system interface means, coupled to said Unix system call interface means, for receiving said plurality of I/O requests form said Unix system call interface means and for mapping ones of said plurality of I/O requests to an I/O routine;
 c. first and second device driver means, coupled to said first and second block oriented I/O device controllers, respectively, including means for providing commands and data in accordance with said first and second command sequences to said respective first and second block oriented I/O device controllers and means for receiving blocks of data from said respective first and second block oriented I/O device controllers; and
 d. common device module means for signalling said first and second device driver means to communicate with said respective block oriented I/O device controllers;

wherein each of said first and second block oriented I/O device controllers is a disk drive controller and wherein said each of said device driver means comprises:
 a. interrupt means, responsive to an interrupt signal from at least one of said first and second block oriented I/O device controllers, for indicating that an I/O operation has been completed;
 b. strategy means, responsive to an initiation signal from said operating system, for initiating the I/O operation; and
 c. printing means, responsive to a diagnostic signal from said common device module means for providing diagnostic error messages.

4. Apparatus for transferring a plurality of input/output (I/O) requests between a Unix operating system and first and second block oriented I/O device controllers operating in accordance with respective first and second command sequences said apparatus comprising:
 a. Unix system call interface means for receiving ones of said plurality of I/O requests;
 b. operating system interface means, coupled to said Unix system call interface means, for receiving said plurality of I/O requests form said Unix system call interface means and for mapping ones of said plurality of I/O requests to an I/O routine;
 c. first and second device driver means, coupled to said first and second block oriented I/O device controllers, respectively, including means for providing commands and data in accordance with said first and second command sequences to said respective first and second block oriented I/O device controllers and means for receiving blocks of data from said respective first and second block oriented I/O device controllers; and
 d. common device module means for signalling said first and second device driver means to communicate with said respective block oriented I/O device controllers;

wherein each of said first and second block oriented I/O device controllers is a tape drive controller and wherein said first and second device driver means each includes first and second sets of I/O command routines, coupled respectively to said Unix system call interface means and to said first and second block oriented I/O device controllers, and the common device module means is configured to transfer status information between said first and second sets of command routines.

5. The apparatus of claim 4, further including buffering means, coupled to said common device module means, for receiving a predetermined amount of data provided by said second set of command routines and for providing only such data as is requested through said Unix system call interface to said first set of command routines.

* * * * *